US008328884B1

(12) United States Patent
Traeger et al.

(10) Patent No.: US 8,328,884 B1
(45) Date of Patent: *Dec. 11, 2012

(54) FLAVORED WOOD PELLET

(75) Inventors: Joseph P. Traeger, Mt. Angel, OR (US); Mark A. Traeger, Silverton, OR (US); Randolph J. Traeger, Mt. Angel, OR (US); Brian E. Traeger, Mt. Angel, OR (US)

(73) Assignee: Traeger Pellet Grills, LLC, Nyack, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,242

(22) Filed: Jun. 13, 2011

Related U.S. Application Data

(63) Continuation of application No. 11/687,965, filed on Mar. 19, 2007, now Pat. No. 7,959,692, which is a continuation-in-part of application No. 10/924,430, filed on Aug. 23, 2004, now Pat. No. 7,517,371.

(51) Int. Cl.
  *C10L 5/00* (2006.01)
  *C10L 5/14* (2006.01)
  *C10L 5/40* (2006.01)
  *A23B 4/052* (2006.01)

(52) U.S. Cl. ............................ 44/550; 44/590; 426/314

(58) Field of Classification Search .................... 44/590, 44/550; 426/314
See application file for complete search history.

(56) References Cited

U.S. PATENT DOCUMENTS

| 2,341,377 A | 2/1944 | Hinderer | |
| 4,102,653 A * | 7/1978 | Simmons et al. | 44/557 |
| 4,298,435 A | 11/1981 | Ledford | |
| 4,874,396 A | 10/1989 | McLeod | |
| 4,941,889 A | 7/1990 | Holmes | |
| 4,960,438 A | 10/1990 | Benesh et al. | |
| 5,244,472 A | 9/1993 | Simmons | |
| 5,296,004 A | 3/1994 | Johnson et al. | |
| 5,421,836 A | 6/1995 | Ross | |
| 5,427,805 A * | 6/1995 | Crace | 426/314 |
| 5,599,360 A | 2/1997 | Stillman | |
| 7,959,692 B1 * | 6/2011 | Traeger et al. | 44/550 |
| 2006/0037236 A1 * | 2/2006 | Traeger et al. | 44/550 |
| 2008/0075820 A1 * | 3/2008 | Fernandez | 426/506 |

OTHER PUBLICATIONS

"The Barbecue Store—For All Your Outdoor Needs—Cabernet Oak Wood Chips," The Barbecue Store, http://web.archive.org/web/20050205015243/www.barbecue-store.com/cabernetoakwoodchips.htm, Accessed Jun. 8, 2010.
Jacobsen, Carl., "Pruning Grapevines," http://ucce.ucdavis.edu/files/filelibrary/616/5855.htm, Published Jan. 2003, Accessed Feb. 27, 2007.
"How to Prune a Grape Vine—eHow.com," eHow.com, http://www.ehow.com/how_172725_prune-grape-vine.html, Accessed Feb. 27, 2007.

(Continued)

*Primary Examiner* — Jim Goloboy
(74) *Attorney, Agent, or Firm* — Alleman Hall McCoy Russell & Tuttle LLP

(57) ABSTRACT

Compositions for wood pellets including grape vine and methods of making wood pellet compositions including grape vine are described. The wood pellets include wood particles, grape vine particles, and a lubricant. The method includes mixing wood particles and grape vine particles with a lubricant, heating the mixture, and forming the mixture into pellets.

17 Claims, 2 Drawing Sheets

OTHER PUBLICATIONS

"Prune Your Grape Vines Heavily in Winter" Carol Savonen, Oregon State University, http://extension.oregonstate.edu/news/story.php?S_No=624&storyType=garden, Accessed Feb. 27, 2007.

"List of Grape Varieties—Wikipedia, the Free Encyclopedia," Wikipedia, http://en.wikipedia.org/wiki/List_of_grape_varieties, Accessed Feb. 27, 2007.

"Grapevine Pruning," Michael Weishan, Country Living, http://magazines.ivillage.com/countryliving/garden/expert/qas/0,,549756_623293,00.html, Accessed Feb. 27, 2007.

King, J., "Pruning Grapes in Home Gardens: Some Basic Guidelines," http://mtvernon.wsu.edu/frt_hort/grape_pruning_basics.htm, Revised May 28, 2003, Accessed Feb. 27, 2007.

* cited by examiner

FLAVORED WOOD PELLET

CROSS-REFERENCE TO RELATED APPLICATIONS

This application is a continuation of U.S. patent application Ser. No. 11/687,965 filed Mar. 19, 2007, which is a continuation-in-part of U.S. patent application Ser. No. 10/924,430 filed Aug. 23, 2004, now U.S. Pat. No. 7,517,371.

BACKGROUND

1. Field of the Invention

The present invention relates to flavored wood pellets containing and made with grape vine.

2. Description of the Related Art

Flavoring briquettes or pellets are commonly used as cooking fuel due to their ability to impart flavor to food during the cooking process. A pellet imparts flavor when smoke released from the pellet during combustion carries flavor to the food. Flavored briquette examples in the prior art include U.S. Pat. No. 4,102,653, which incorporates spices into a briquette, and U.S. Pat. No. 4,960,438, which incorporates olive oil into a briquette. These briquettes impart certain flavors to food, but they do not provide the characteristic smoked wood flavor of food cooked over an open flame or the flavor or taste of a wine.

Pellets comprising mixtures of wood have been manufactured to provide wood flavor during cooking. Generally, wood that imparts flavor, known as flavor wood, and a wood that does not impart flavor, known as base wood, have been combined to produce pellets that impart a wood flavor into the food. Mixtures of base and flavor woods have been used because if a wood pellet was made entirely from a flavor wood, then the food cooked with that pellet may taste too strong to appeal to most people.

SUMMARY

Compositions for wood pellets comprising grape vine and methods of making wood pellet compositions comprising grape vine are described. The wood pellets are comprised of wood particles, grape vine particles, and a lubricant. The method for making wood pellets includes the steps of milling the wood and the grape vine into particles, mixing the wood particles with grape vine particles and the lubricant, heating the mixture, and forming the mixture into pellets. Food cooked over such pellets exhibits flavors similar to the wines typically made from the grape plants that produced the grape vines. The wood pellets described herein may make use of the pruned material from vineyards or farms of grape plants.

DETAILED DESCRIPTION

Figure 1:
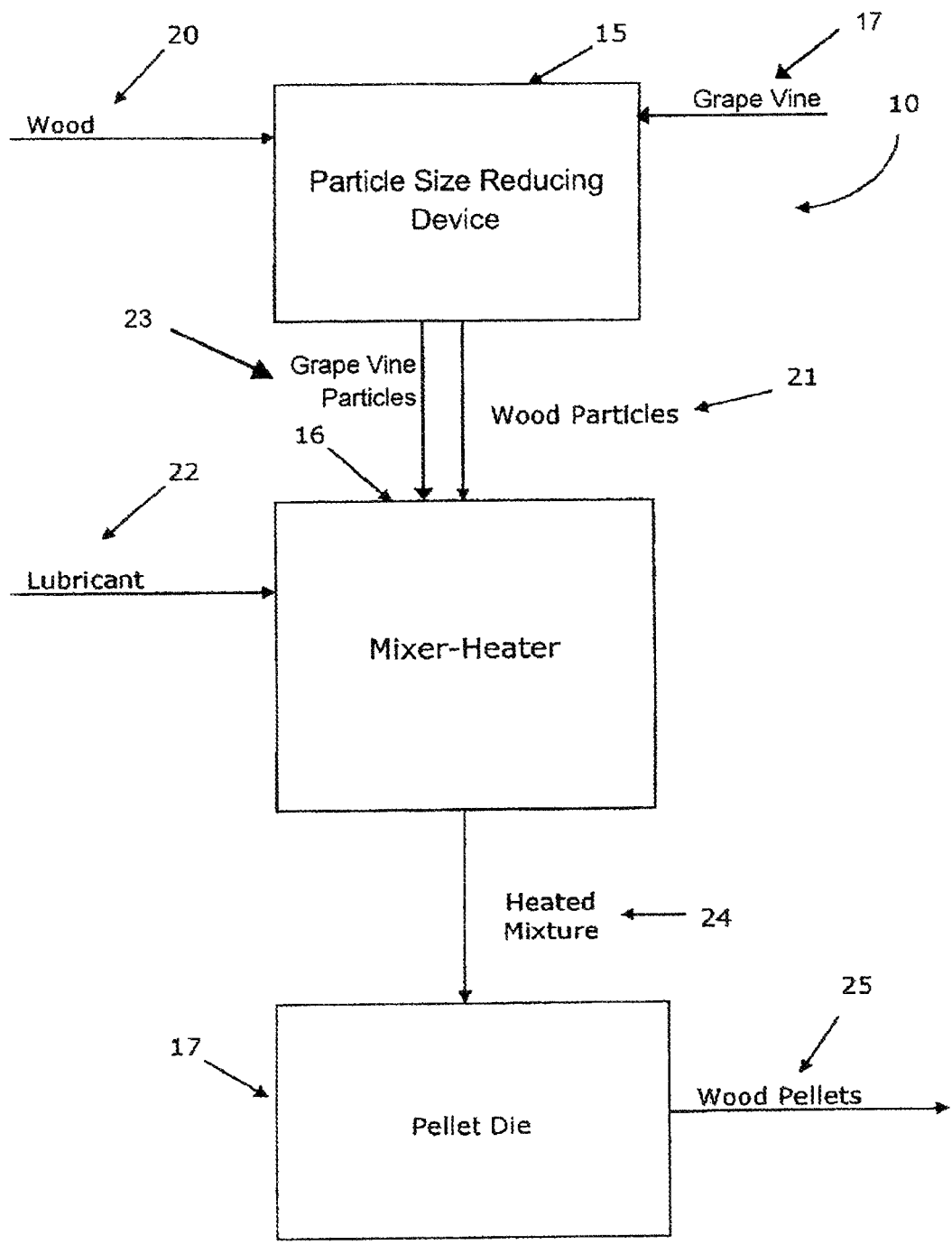
FIG. 1 is a schematic depiction of a first embodiment.
Figure 2:
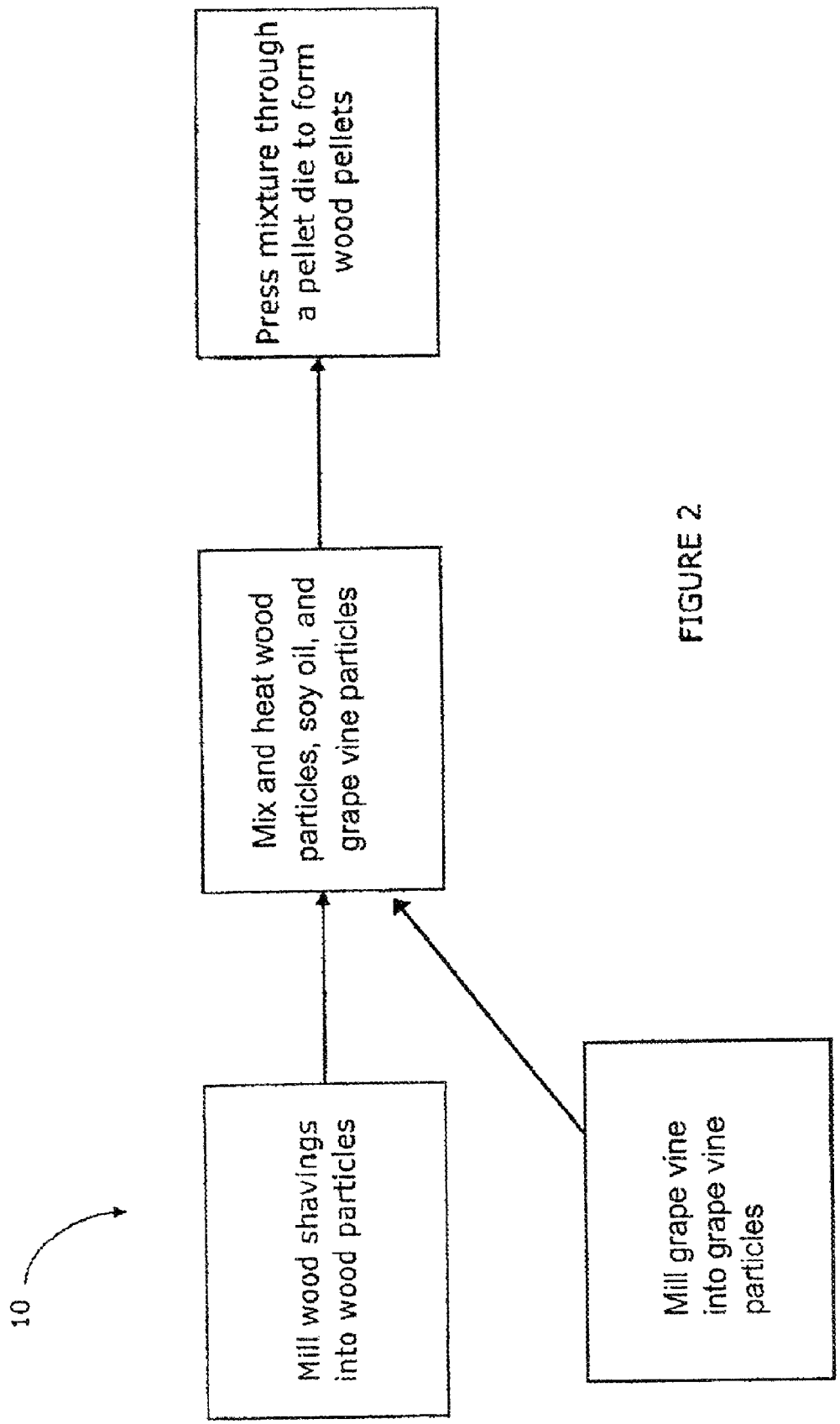
FIG. 2 is a flow diagram depiction of the embodiment of FIG. 1.

A first embodiment for manufacturing the wood pellets containing grape vine will be described. As shown in FIGS. 1 and 2, a method 10 of making wood pellets 25 is provided. A base wood 20 and a base grape vine 17 are reduced to small wood particles 21 and small grape vine particles 23 with a particle size-reducing device 15. The small wood particles 21 and small grape vine particles 23 are mixed with a lubricant 22 in a mixer-heater 16. The mixture of the wood particles 21, grape vine particles 23, and lubricant 22, is then heated in the mixer-heater 16, and the heated mixture 24 is formed into pellets 25 with a pellet die 17.

Alder and oak wood are the preferred base wood materials to form the small wood particles 21, however, other wood types may also be used if readily available. The base wood preferably is initially in the form of wood shavings, or alternatively, in other forms such as of chunks, chips, sawdust, or whole wood.

Nearly any species of grape plant may be used to provide the base grape vine 17. However, grape plants whose grapes have desirable flavor qualities typically used in wine making such as, for example, cabernet sauvignon, merlot, pinot noir, chardonnay, etc. and mixtures thereof are preferred. Suitable species of grape plants to provide the base grape vine 17 include, for example, the *Vitis vinifera, Vitis labrusca, Vitis riparia, Vitis aestivalis*, and other *Vinifera* and non-*Vinifera* hybrids. Mixtures of these different grape vines may be employed.

Grape plants that are used in the production of both table grapes and wine grapes generally require pruning every spring while the grape plant is still dormant. Typically, up to approximately 90% of the grape plant is removed during the spring pruning. The pruning significantly improves the grape production and harvest, as last year's canes do not generally again produce fruit. During the pruning, most of the prior year's growth of canes is removed. As such, the wood pellet composition provides a use for a renewable resource that otherwise requires disposal. In many grape-growing regions, the pruned grape vines from industrial grape production facilities are burned.

After pruning, the base grape vine 17 is preferably dried before it is reduced to the grape vine particles 23. The base grape vine 17 may be dried in a kiln, similar to those kilns commonly used in the drying of forestry and other wood products. The base grape vine 17 may also be dried in covered storage having sufficient ventilation. The base grape vine 17 that is pruned from the grape plant was a living portion of the grape plant and thus has a significant moisture content. The drying of the base grape vine 17 concentrates the flavor in the base grape vine 17, as the moisture, which may have formed a substantial portion of the weight of the base grape vine 17, is removed. Importantly, the drying of the base grape vine 17 improves the milling characteristics of the grape vine particles 23, since the base grape vine 17, if not dried, will form more of a mush or paste during its processing instead of the desired grape vine particles 23.

After the base grape vine 17 is dried, the grape vines may be optionally chopped or shredded in conventional grinding equipment before the milling process. This allows the milling process to work more efficiently. Reducing the base wood to a fine powder is advantageously utilized in this embodiment. The particle size of the base wood and base grape vine is further reduced to any particle size compatible with the pelleting process equipment. Milling is the preferred particle size reducing method, and particularly, milling using a hammer mill with a #3 screen. Other particle size reducing methods such as chopping, sawing, or shredding could also be used.

After milling, the small wood particles 21 and the grape vine particles 23 may have an average overall diameter or width of approximately ⅛ inch to approximately ½ inch. Preferably, the small wood particles 21 and the grape vine particles 23 have an average overall diameter or width of approximately ¼ inch, which is provided by the #3 screen of the hammer mill. Of course, one of ordinary skill in the art will recognize that the milling process will create many particles smaller than these size parameters, since the technology, for example, a hammer mill, used to reduce the base grape vine 17 and the base wood 20 ensures that the particles are roughly below a certain size. Moreover, hammer-milling, grinding, and chopping are destructive techniques resulting in many smaller particles than the size parameters described herein.

Mixing the lubricant, grape vine particles, and wood particles may be performed simultaneously or in multiple steps. For example, this embodiment first mixes the wood particles and grape vine particles together, which may provide certain processing advantages depending on the equipment configuration utilized, prior to mixing further with the lubricant. However, the wood particles and lubricant could alternatively be mixed together prior to adding the grape vine particles or all three components could be mixed together at the same time. Any order of operations with respect to the mixing of the lubricant, grape vine particles, and wood particles is within the scope of the invention.

A ratio of approximately 1 part by weight grape vine particles to approximately 6 to approximately 12 parts by weight wood particles may be used in forming the wood pellets, but other ratios to produce different flavor levels may be employed. In one embodiment, a ratio of approximately 1 part by weight grape vine particles to approximately 9 parts by weight wood particles is advantageous to form the wood pellets.

This embodiment utilizes soybean oil as a lubricant, but other lubricants, especially other edible lubricants, may be used. In other embodiments, a wood oil may be used in the composition in conjunction with the grape vine to add additional flavoring. For example, hickory wood oil will provide a hickory wood flavor when cooking as compared to a mesquite wood oil which will provide a mesquite wood flavor when cooking. Any wood oil containing a desired flavor is within the scope of this invention, and particularly: apple, alder, cherry, hazelnut, hickory, maple, mesquite, oak, and pecan wood oils.

The lubricant is mixed with the wood particles and grape vine particles in a ratio range of 1-3 gal (gallon) of lubricant to approximately 200 lbs. of grape vine and approximately 1800 lbs. base wood. A preferred ratio is 2 gal of the lubricant to approximately 200 lbs. of grape vine particles and 1800 lbs. of base wood. Thus, the overall ratio of components in the preferred pellet embodiment on a weight/weight basis is: 36 parts lubricant, and 117 part wood particles, and 13 parts grape vine particles. Another way to determine the proper ratio is to state that 32 lbs of lubricant can be used to make 2000 lbs of pellets.

In further processing, the lubricant, grapevine particles, and wood particles mixture is formed into pellets. The favored pellet forming method is to heat the mixture to at least approximately 100 degrees Celsius (100° C.±5° C.) and then to compress and shape the heated mixture with a hard steel pellet die. In addition to a pellet die, other conventional pellet forming equipment may also be used. Pressures of 10,000 psi (pounds per square inch) effectively produce pellets, but higher and lower pressures may be suitable in certain applications.

The wood pellet of this invention can be used when cooking to impart a smoked wood and a wine/grape flavor to food. The pellets are placed and ignited near food to release heat and smoke. The smoke contains wood flavor from the wood particles and wine/grape flavors from the grape vine particles contained in the pellet, which is transferred to the food while it cooks. The heat produced by the combustion of the pellet is used to cook the food.

The pellet produces a smoked wood and wine flavor that can be transferred to food while cooking. Furthermore, different embodiments of the invention can impart different types of smoked wine flavors depending on the grape vine used. Thus, the pellets can provide a wide range of smoked wine flavors to food to satisfy a variety of personal taste preferences.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

What is claimed is:

1. A wood pellet, comprising:
   a lubricant;
   grape vine particles, wherein the grape vine particles are from grape plant vines of at least one of cabernet sauvignon, pinot noir, merlot, and chardonnay; and
   wood particles, wherein the grape vine particles and the wood particles are mixed with the lubricant, and wherein the wood pellet is free from wood oil.

2. The wood pellet of claim 1, wherein the lubricant includes an edible lubricant.

3. The wood pellet of claim 1, wherein the lubricant includes soybean oil.

4. The wood pellet of claim 1, wherein the wood particles include at least one of alder and oak wood particles.

5. The wood pellet of claim 1, wherein the grape vine particles and the wood particles have one of an average overall diameter and an average overall width of approximately ⅛ inch to approximately ½ inch.

6. The wood pellet of claim 1, wherein the wood pellet contains a ratio of approximately 1 part by weight of grape vine particles to approximately 6 to approximately 12 parts by weight of wood particles.

7. A method of making wood pellets from wood particles, comprising:
   mixing wood particles, grape vine particles, and a lubricant, wherein the grape vine particles are from grape plant vines of at least one of cabernet sauvignon, pinot noir, merlot, and chardonnay;
   heating the mixture of the wood particles, the grape vine particles, and the lubricant to at least approximately 100 degrees Celsius; and
   forming the mixture of the wood particles, the grape vine particles, and the lubricant into a pellet, wherein the mixture is without wood oil.

8. The method of claim 7, further comprising drying base grape vine and milling the base grape vine to form the grape vine particles.

9. The method of claim 7, further comprising compressing the wood particles, the grape vine particles, and the lubricant into pellets.

10. The method of claim 7, wherein compressing the wood particles, the grape vine particles, and the lubricant includes compressing the wood particles, the grape vine particles, and the lubricant into pellets using a die.

11. A method of making wood pellets, comprising:
   reducing a base wood into wood particles;
   reducing a base grape vine into grape vine particles, wherein the grape vine particles are from grape plant vines of at least one of cabernet sauvignon, pinot noir, merlot, and chardonnay;

mixing the wood particles and the grape vine particles with a lubricant; and compressing the mixture of the wood particles, the grape vine particles, and the lubricant into pellets, wherein the method does not include mixing wood oil with at least one of the wood particles, the grape vine particles, and the lubricant.

12. The method of claim 11, wherein reducing a base wood includes reducing the base wood into the wood particles by milling, and wherein reducing a base grape vine includes reducing the base grape vine into the grape vine particles by milling.

13. The method of claim 11, wherein reducing a base wood includes reducing the base wood that includes at least one of wood shavings, chunks, chips, sawdust, and whole wood from one of alder and oak, into the wood particles.

14. The method of claim 11, wherein reducing a base wood includes reducing the base wood into the wood particles having one of an average overall diameter and an average overall width of approximately 1/8 inch to approximately 1/2 inch.

15. The method of claim 11, wherein reducing a base grape vine includes reducing the base grape vine into the grape vine particles having one of an average overall diameter and an average overall width of approximately 1/8 inch to approximately 1/2 inch.

16. The method of claim 11, wherein compressing the mixture includes compressing the mixture of the wood particles, the grape vine particles, and the lubricant into pellets using a die.

17. The method of claim 11, wherein mixing the wood particles and the grape vine particles include mixing the wood particles and the grape vine particles at a ratio of approximately 1 part by weight of grape vine particles to approximately 6 to approximately 12 parts by weight of wood particles with the lubricant.

* * * * *